United States Patent [19]
Ung

[11] Patent Number: 5,895,193
[45] Date of Patent: Apr. 20, 1999

[54] CONTAINER HAVING CATERPILLAR MECHANISM FOR FAST LOADING/ UNLOADING OF CARGOS

[76] Inventor: Lu-Hsiung Ung, Fl. 2, No. 5, Lane 3, Hsing Tong Street, Taipei, Taiwan

[21] Appl. No.: 08/786,432

[22] Filed: Jan. 21, 1997

[51] Int. Cl.⁶ ................................................. B65G 15/00
[52] U.S. Cl. ............... 414/327; 414/390; 414/398; 414/528; 414/288; 198/832.2; 198/842; 220/1.5
[58] Field of Search .................................. 414/519, 520, 414/288, 528, 403, 398, 390, 327, 787; 198/832.2, 842, 721; 193/22, 1; 308/125, 7; 220/1.5, 244, 334, 315

[56] References Cited

U.S. PATENT DOCUMENTS

| | | | |
|---|---|---|---|
| 657,639 | 9/1900 | Brestle | 414/518 X |
| 891,355 | 6/1908 | Mitchell et al. | 193/2 D X |
| 997,276 | 7/1911 | Curtis | 193/2 D X |
| 1,530,478 | 3/1925 | Carlson | 198/832.2 |
| 2,873,848 | 2/1959 | Steinmetz | 198/832.2 |
| 3,000,490 | 9/1961 | Sebastian | 198/721 |
| 3,247,983 | 4/1966 | Thompson | 414/528 X |
| 3,677,423 | 7/1972 | Tollefsrud et al. | 198/721 X |
| 4,293,062 | 10/1981 | Bustos | 193/2 D |
| 5,092,444 | 3/1992 | Agnoff | 193/2 D |

FOREIGN PATENT DOCUMENTS

| | | | |
|---|---|---|---|
| 343111 | 11/1989 | European Pat. Off. | 193/1 |
| 161340 | 9/1983 | Japan | 414/398 |

Primary Examiner—Frank E. Werner
Attorney, Agent, or Firm—Bucknam and Archer

[57] ABSTRACT

An improved container having caterpillar mechanism for loading/unloading of cargos comprises a bottom plate formed with caterpillar mechanism and left/right side walls with two lateral openings. During loading/unloading cargos, a conveyor having the same level height as the caterpillar belt is used to quickly accept the whole cargos being moved out on belt by means of pushing/pulling force exerted on the cargos.

2 Claims, 5 Drawing Sheets

CONTAINER HAVING CATERPILLAR MECHANISM FOR FAST LOADING/ UNLOADING OF CARGOS

FIELD OF THE INVENTION

The present invention relates to an improved container having caterpillar mechanism for fast loading/unloading of cargos, and more particularly to the bottom plate of the container formed as conveyor mechanism by linking a series of caterpillar pieces, so that a large quantity of cargos can be pushed into/pulled out from the container at a time to speedily complete the loading/unloading of cargos.

BACKGROUND OF THE INVENTION

The conventional cargo container currently used has generally a single side opening. The loading operation is carried on manually or by a forklift to stack cargos in order from inside outwardly; the unloading operation just reverses the direction. Therefore, the conventional loading and unloading operations require too much man power and working time. Furthermore, the cargos can not be stacked up to the top ceiling of the container due to elevating mechanism of the forklift needs some space for operation, thus the internal space of the container is not occupied with enough cargos; consequently to raise freightage.

In view of the above, the main object of the present invention is to provide an improved container which has caterpillar mechanism on the bottom portion of the container for fast loading/unloading of cargos, and its left and right side walls form two lateral openings respectively as the passages of cargos, wherein a caterpillar belt of caterpillar mechanism is formed by linking a series of caterpillar pieces having holes along the internal edge, and surrounding around two sprockets which are fixed on the two ends of two steel girders at the left and right ends of the bottom portion of the container. Also, a plurality of parallel rollers are provided equidistantly between the two sprockets for abutting on the internal edge of the caterpillar belt to rotate freely, so that the caterpillar belt can be held on a horizontal plane when carrying cargos on it. Moreover, at the portions of the two sprockets which are not surrounded by the chains where each provided with a stopping block to brake the two sprockets from turning after cargos being placed in position, so that the cargos will not slide during transportation of the container.

In accordance with the present invention, the improved container having a caterpillar mechanism for fast loading/ unloading of cargos, the process for loading/unloading can be carried by just using a conveyor which has the same level height as that of the caterpillar belt to abut on the opening of the container, and then pushing the cargos stacked on the conveyor into the container manually or by mechanical force at a time, or the cargos inside the container can be pulled out to the conveyor at a time. Alternatively, by using two conveyors abutted on the two openings of the container respectively, the cargos inside the container can be pulled out to one of the conveyors, while the stacked cargos on the other conveyor can be pushed into the container so as to finish loading/unloading simultaneously.

For the above object, features and effectiveness of the present invention will be better understood by the following detailed descriptions of the embodiment with the accompanying drawing.

Figure 1:
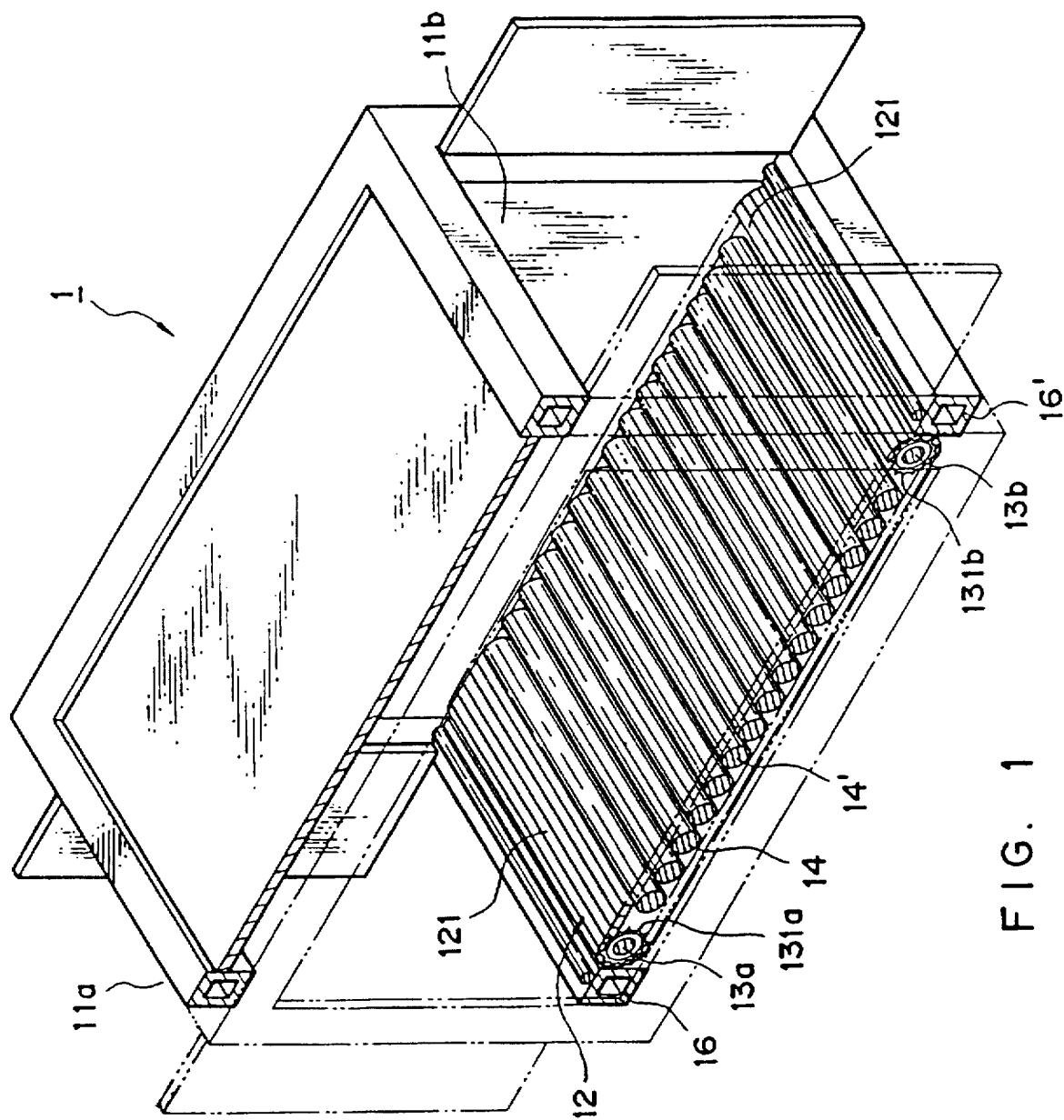
FIG. 1 shows the perspective view of the embodiment of the present invention with one side being shown in repeat line.
Figure 2:
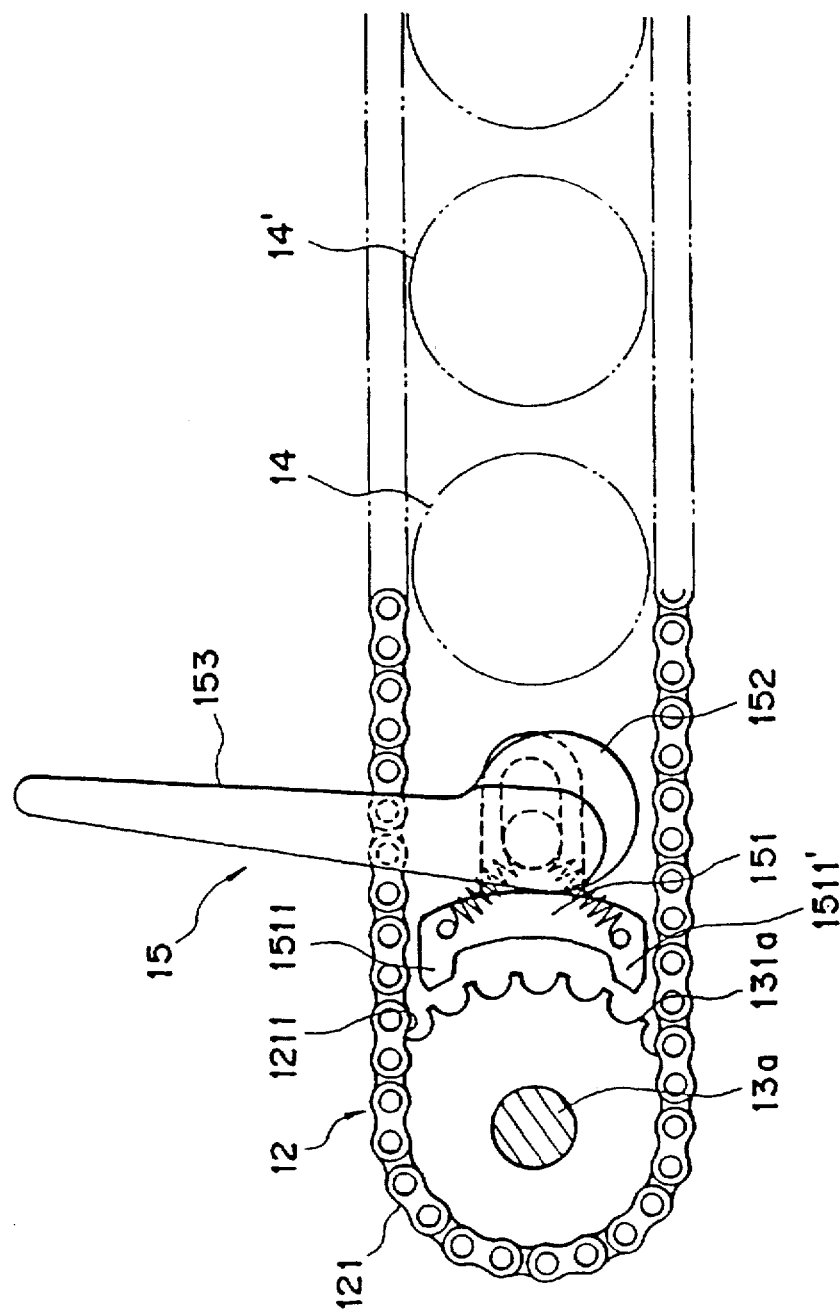
FIG. 2 is a partial schematic front view of the caterpillar belt and the sprocket, wherein a stopping block is in a free state.
Figure 3:
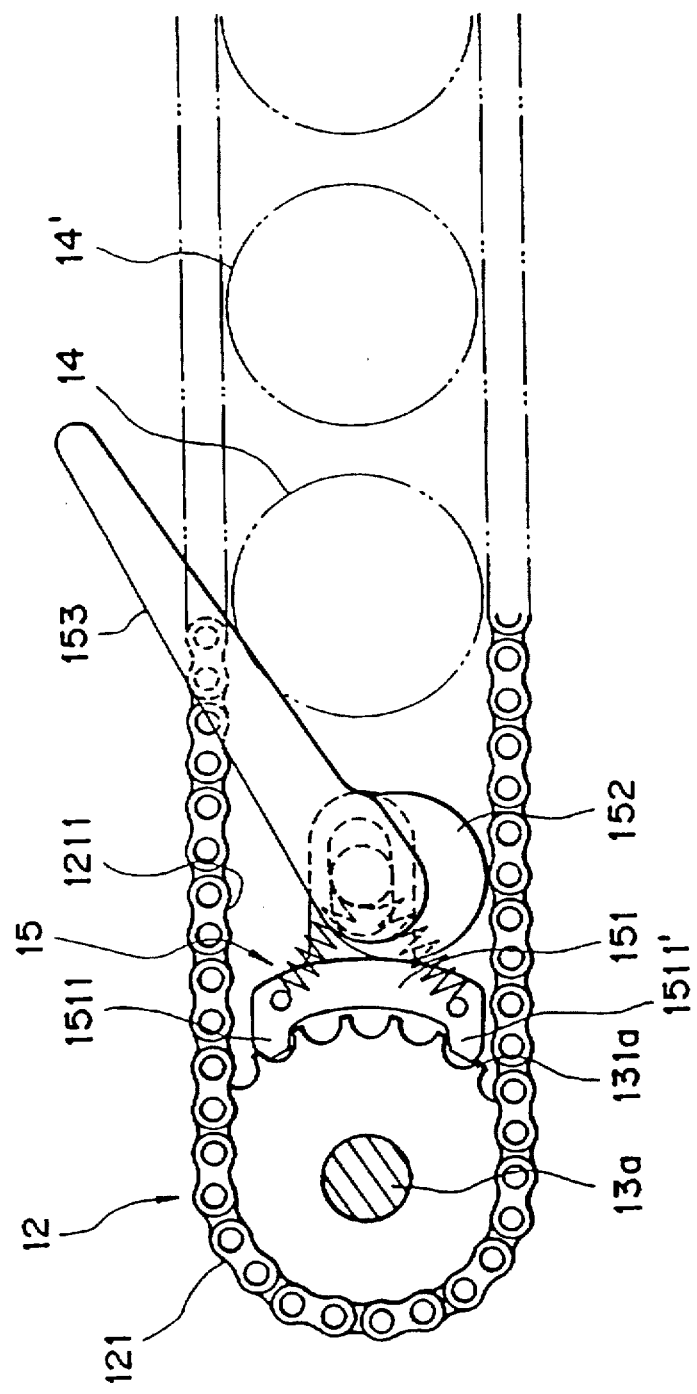
FIG. 3 is the same as FIG. 2 in the front view, but with the stopping block engaged with the sprocket.

Please refer to FIG. 1 first, the improved container (1) having caterpillar mechanism for fast loading/unloading of cargos is compatible with the ISO standard. Two lateral openings (11a, 11b) are formed by the left and right side walls for passing of cargos. The bottom portion is formed by a caterpillar belt (12), which is constructed by linking a series of caterpillar piece (121) having holes (1211) along the internal edges and surrounds around the two sprockets (13a, 13b) having teeth (131a, 131b) which are installed on the internal sides of two steel girders (16,16') located at two ends of the bottom portion of the container, and with the sprocket teeth (131a, 131b) of the sprockets (13a, 13b) being engaged with the caterpillar holes (1211) of the caterpillar piece (121). A plurality of rollers (14, 14') in parallel are provided equidistantly within the space enclosed by the two sprockets (13a, 13b) and the caterpillar belt (12). These rollers (14, 14') abut on the bottom surface of the caterpillar belt (12), and can rotate freely, so that the caterpillar belt (12) can be held on a horizontal plane for supporting weight of the cargos. Moreover, as shown in FIG. 2, the internal ends of the two sprockets (13a, 13b), which are not surrounded by the caterpillar belt (12), are each provided with a stopping means [15, 15' (not shown)]. Each stopping block (15, 15') has an arc sliding block (151) with an arc surface facing to the sprocket and each end of arc surface is provided with a pawl (1511, 1511'). Furthermore, a guide slot is provided on the back of the slide block with an eccentric shaft (152) received in it. After placing the cargos on the caterpillar belt, the handle (153) of the eccentric shaft (152) is operated to rotate the eccentric shaft (152) and push the arc sliding block (151) toward teeth (131a, 131b) of the sprocket (13a, 13b) to the effect that the two pawls enter into the recess between two teeth (131a, 131b) to prevent the sprockets from turning, as shown in FIG. 3, so that the cargo (1) on the caterpillar belt will not slide during transportation.

Figure 4:
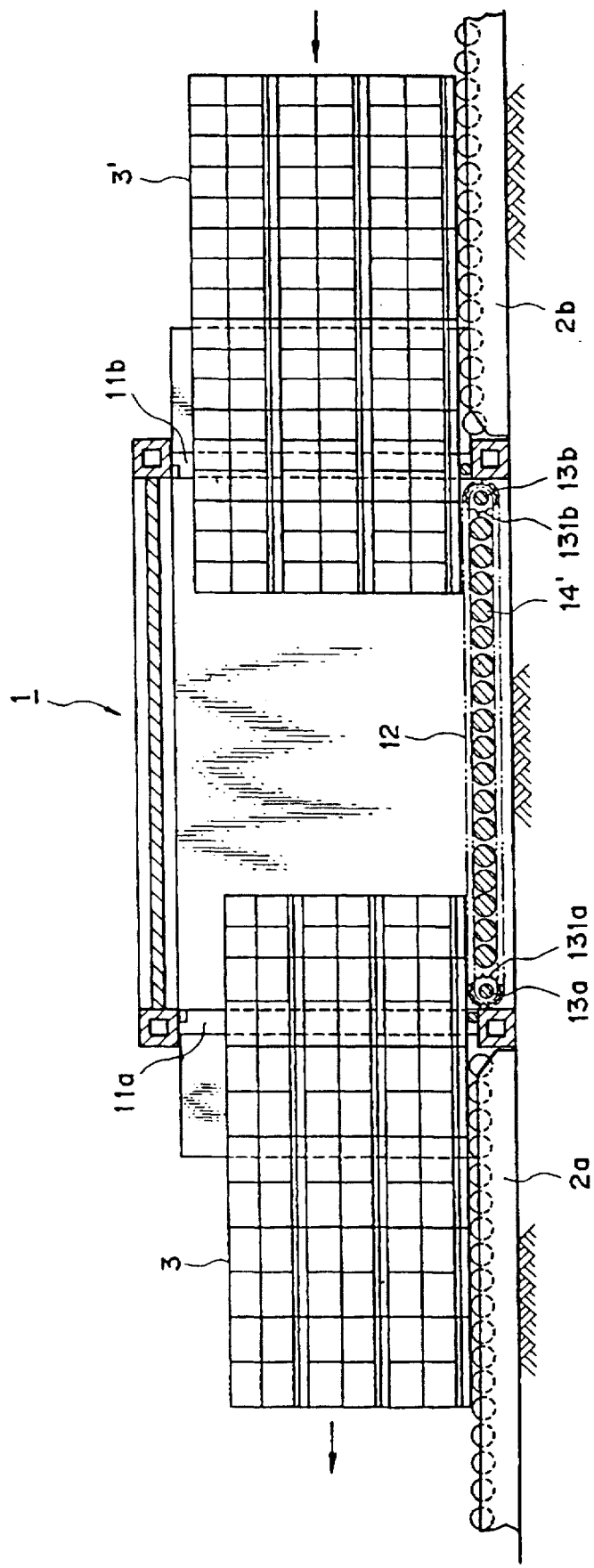
FIG. 4 is a schematic sectional front view to show the loading/unloading process of the present invention.

Please refer to FIG. 4, according to the improved container having caterpillar mechanism for fast loading/ unloading of cargos of the present invention, the loading/ unloading process just uses conveyors (2a, 2b) having the same level height as the upper surface of the caterpillar belt in the container (1) and abut on the openings (11a, 11b) of the container (1). The operator can release the stopping means (15, 15'), and pull or push on the cargo (3) inside the container (1) manually or by mechanical force, to cause the caterpillar belt to be turned. So the cargo can be moved out and transferred to the conveyor (2a), while the packed cargos (3') on the conveyor (2b) can be pushed into the container (1) so as to finish loading/unloading simultaneously. The operation can be done with loading or unloading only.

Figure 5:
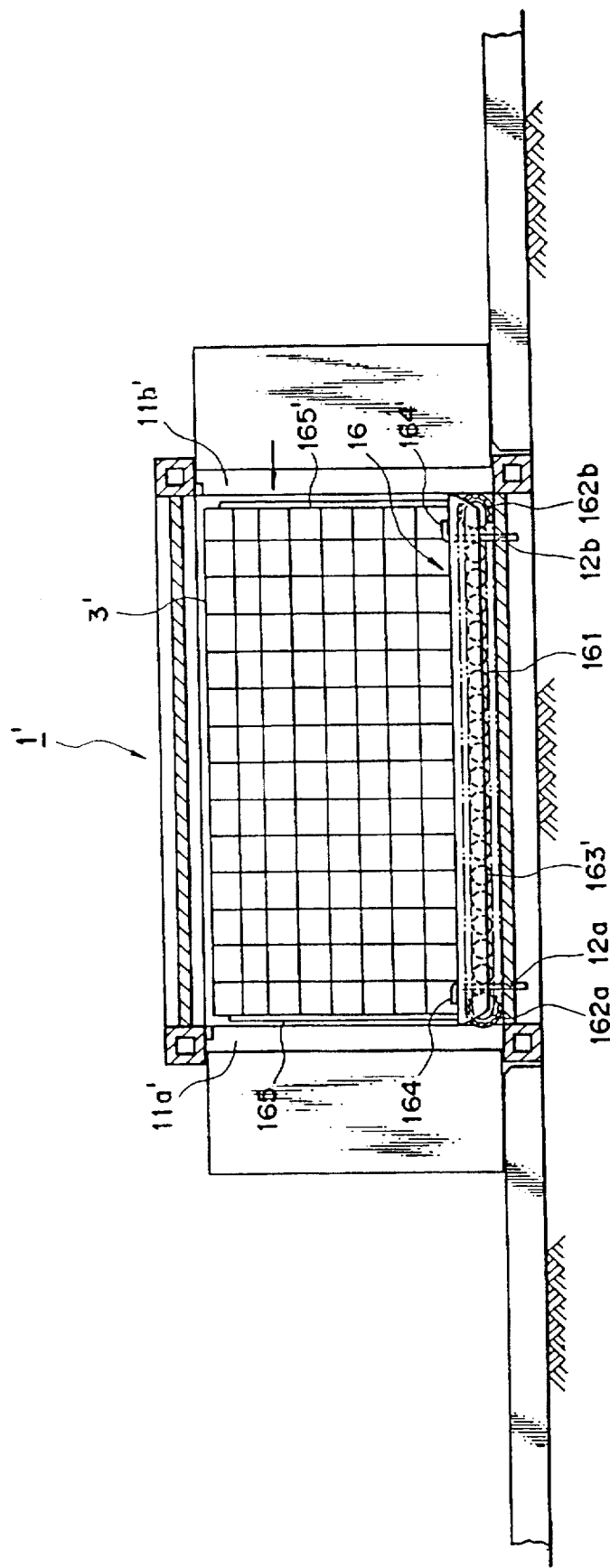
FIG. 5 is a schematic front view of another embodiment of the present invention, showing the loading/unloading process by means of a movable plate with caterpillar belt.

The above object, features and effectiveness of the present invention can also be attained by the following practical embodiment. Please refer to FIG. 5, an improved container (1') having left and right side walls with two lateral openings (11a', 11b') is used, which has the conventional bottom plate of a container, and its loading/unloading process is performed by a movable plate (16) carried by caterpillar means (161). The construction of the caterpillar means (161) is the same as usual one. It includes two sprockets (162a, 162b) provided on two ends of the bottom plate (16) and a belt surrounded around sprockets. The teeth of the sprockets are engaged with holes of the caterpillar belt. A plurality of parallel rollers (163, 163') are provided equidistantly between the two sprockets of the caterpillar belt (161) and can be rotated freely. Moreover, two upright end plates (165, 165') are each pivoted at the left and right ends of the plate (16) respectively and can be folded inward to hold the cargos (3'). When loading cargos, the cargos (3') are packed on the movable plate (16) with the two upright end plates being upright to hold the cargos, and then the caterpillar means (161) with the movable plate (16) is pushed/pulled into the container (1'). Two pins (164, 164') are inserted into the positioning holes (12a, 12b) of the container (1') at two ends to prevent the caterpillar means (161) from moving during transportation. The unloading operation is reversed accordingly.

Summing up the above, by means of the improved container having caterpillar mechanism for fast loading/unloading of cargos of the present invention, the loading/unloading operation can be done within a very short time. The internal space of the container is sufficiently utilized, man power and freightage are also reduced. Therefore, it is indeed an invention with applicability.

I claim:

1. An improved container having a caterpillar mechanism for the fast loading/unloading of cargos, said container comprising:

a) left and right side walls, front and rear side walls, said left and right side walls having openings formed therein for the passage of cargos therethrough;

b) a caterpillar mechanism forming a bottom portion of said container including a first sprocket proximate the left side wall of said container, a second sprocket proximate the right side wall of said container, an endless caterpillar belt extending between said first and second sprockets having upper and lower stringers and formed by a series of linked parallel caterpillar pieces each having an opening therein, said first and second sprockets having sprocket teeth with a pitch adapted for operable engagement with the openings in said caterpillar pieces, and a plurality of parallel equidistantly spaced rollers disposed between the upper and lower stringers of said endless caterpillar belt supporting said upper stringer; and c) a stopping block associated with each of said first and second sprockets for braking and preventing said caterpillar belt from moving, each said stopping block including an arc sliding block having an arc surface having opposing ends and facing a portion of the respective sprocket unengaged with said caterpillar pieces, said arc surface having pawls at each end matching the pitch of the sprocket teeth, a guide slot arranged on said sliding block, a handle operated eccentric having a shaft received in said guide slot, a biasing spring connecting each end of said arc surface to said eccentric shaft, whereby movement of said eccentric by means of said handle moves said arc surface towards the respective sprocket unengaged with said caterpillar pieces to engage said pawls with said sprocket teeth thereby preventing movement of said sprocket and said caterpillar belt.

2. An improved container having a caterpillar mechanism for the fast loading/unloading of cargos, said container comprising:

a) left and right side walls, front and rear side walls, and a conventional bottom plate, said left and right side walls having openings formed therein for the passage of cargos therethrough;

b) a movable plate on which said cargos are carried, said movable plate including an upright end plate pivoted at a left end of said movable plate and an upright end plate pivoted at a right end of said movable plate for holding said cargos on said movable plate;

c) a caterpillar mechanism on which said movable plate is mounted for moving said movable plate and cargos carried thereby onto the bottom plate of said container, said caterpillar mechanism including a first sprocket having teeth and mounted at the left end of said movable plate, a second sprocket having teeth and mounted at the right end of said movable plate, an endless caterpillar belt extending between said first and second sprockets having upper and lower stringers with openings therealong engageable with the teeth of said sprockets, and a plurality of equidistantly spaced rollers disposed between the upper and lower stringers of said endless caterpillar belt supporting said lower stringer so that said caterpillar mechanism supporting said movable plate thereon can be moved into and out of said container on the bottom plate thereof; and d) a vertically movable pin carried at the left and right ends of said movable plate engageable with a respective positioning hole at a left and right end of said bottom plate of said container to fix the position of said movable plate carried by said caterpillar mechanism within said container.

* * * * *